(12) United States Patent
Mahadik et al.

(10) Patent No.: US 8,650,287 B2
(45) Date of Patent: Feb. 11, 2014

(54) LOCAL REPUTATION TO ADJUST SENSITIVITY OF BEHAVIORAL DETECTION SYSTEM

(75) Inventors: Vinay Mahadik, Milpitas, CA (US); Bharath Madhusudan, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 233 days.

(21) Appl. No.: 13/095,545

(22) Filed: Apr. 27, 2011

(65) Prior Publication Data

US 2013/0246605 A1    Sep. 19, 2013

(51) Int. Cl.
*G06F 15/173*    (2006.01)
(52) U.S. Cl.
USPC ........... 709/224; 709/206; 709/225; 709/226; 726/1; 726/25; 726/26; 726/27
(58) Field of Classification Search
USPC ................ 709/206, 224–226; 726/1, 25–27
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2008/0249788 A1* | 10/2008 | Heller et al. | 705/1 |
| 2012/0030302 A1* | 2/2012 | Lund et al. | 709/206 |
| 2012/0042365 A1* | 2/2012 | Shoval et al. | 726/7 |
| 2012/0240228 A1* | 9/2012 | Alperovitch et al. | 726/22 |

* cited by examiner

*Primary Examiner* — Quang N Nguyen
*Assistant Examiner* — Hitesh Patel
(74) *Attorney, Agent, or Firm* — Patent Capital Group

(57) ABSTRACT

Source assets are monitored for activities, each activity associated with a corresponding activity weight indicating probability of the activity resulting from a security compromise. A source asset is determined to perform a particular activity indicative of a potential security compromise, such as a download of an executable of malicious reputation. A source asset tracking instance is instantiated to include data identifying the particular activity. The tracking instance is to be updated based on identification of subsequently monitored activities. A reputation value is determined for the activity weight of the particular activity based at least in part on the malicious reputation of the executable. An asset reputation is determined for the source asset from the corresponding activity weights of monitored activities involving the source asset and a security risk is determined when the asset reputation exceeds a threshold.

20 Claims, 4 Drawing Sheets

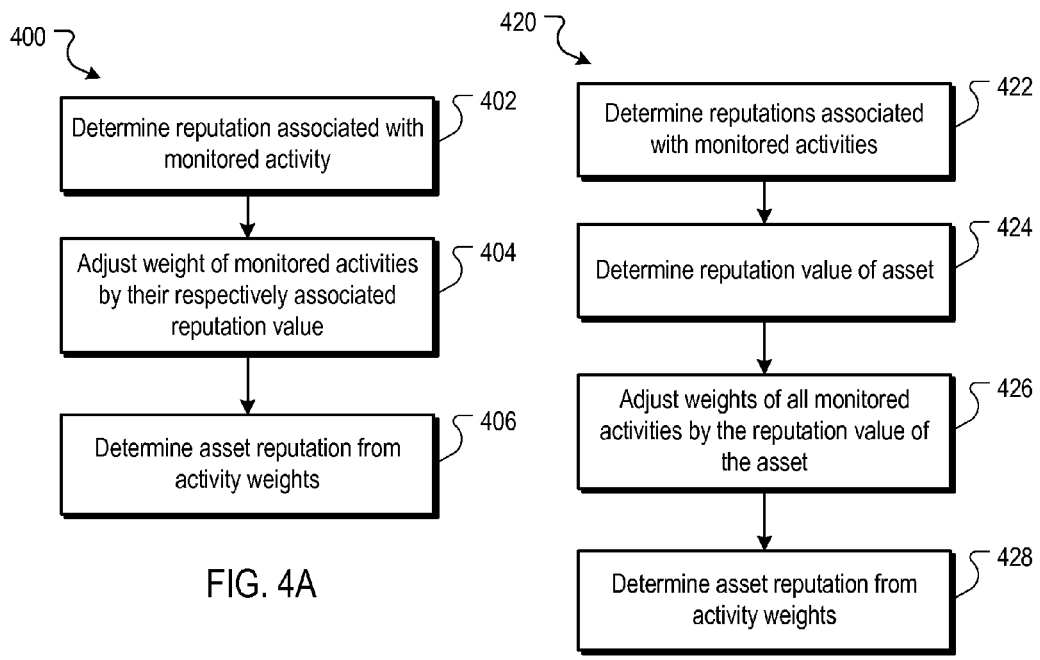

LOCAL REPUTATION TO ADJUST SENSITIVITY OF BEHAVIORAL DETECTION SYSTEM

BACKGROUND

This specification relates to network security.

A network is a system of computer assets in data communication. Many networks are private networks, e.g., a particular network may be an internet protocol based network that is logically independent from other internet protocol based networks. An enterprise network of a company that is connected to the Internet through a router and firewall is one such example of a private network.

One or more security provisioning systems can be used to protect each network from attacks by malicious software and users. For example, network security systems includes network sensors that are deployed on the edge of a protected network or within the network, and one or more network security servers in data communication with the network sensors. The sensors monitor the actions of assets that are attempting to gain access to the network or that have been granted access to the network and report actions taken by the assets to network security servers. The sensors can take actions with respect to an asset immediately, or can take actions with respect to the asset as determined by the network security server(s), depending upon a number of security related factors.

The network security server(s) process the data reporting the monitored actions of assets and determine, based on the monitored actions, whether particular assets are a security risk, e.g., infected with a virus or under control of a malicious agent, such as a bot. One technique for determining whether an asset is a security risk is to assign weights to a list of predefined activities that are to be monitored for each asset. If an asset is observed performing the activity (e.g., a heuristic that is to be monitored), then the weight associated with the activity is attributed to the asset. The weights that are then attributed to the asset from the observed activities are then processed to determine whether the asset is a security risk. For example, the weights may be aggregated, averaged, or processed according to some other function to determine a value that is compared to a risk threshold. If the value exceeds the risk threshold, then the asset is determined to be a security risk.

Such detection processes, however, are susceptible to false positive or false negative detections. In particular, each of the heuristics or activities is not a heuristic or activity that is solely associated with malicious agents. In fact, many of the activities may be performed as a result of a legitimate process. For example, one common activity that is often monitored is a connection attempt to an invalid address, e.g., an invalid Internet Protocol (IP) address and port number combination. The activity may be the result of the legitimate process, e.g., a request for a software update from a trusted provider when the trusted provider's server is down, or the trusted provider has moved the software update service to a different host. Likewise, the activity may be the result of a malicious process, e.g., a bot that has overtaken the computer and is scanning a network for services to exploit. In both cases, the weights associated with the activity contribute equally to the determination of whether an asset is a security risk. However, in the case of the former, the asset presents no security risk; conversely, in the case the latter, the asset presents a significant security risk. Thus, for a relatively high number of monitored occurrences of the action in the former case, the security system may incorrectly identify the asset as a security risk. Conversely, for relatively low number of monitored occurrences of the action in the latter case, the security system may incorrectly determine that the asset is not a security risk.

SUMMARY

In general, one innovative aspect of the subject matter described in this specification can be embodied in methods that include the actions of monitoring source assets in a network for activities that are indicative of potential security compromises, the network being an internet protocol based network that is logically independent from other internet protocol networks, and each activity that is being monitored being associated with a corresponding activity weight that is indicative of the reliability of the activity being the result of an actual security compromise; in response to monitoring an source asset performing an activity indicative of a potential security compromise, instantiating an source asset tracking instance in a computer memory, the source asset tracking instance including data identifying the source asset and the monitored activity; for each source asset tracking instance in the computer memory: updating the source asset tracking instance with data identifying subsequently monitored activities indicative of a potential security compromise in response to each monitoring of the source asset performing the subsequently monitored activity; determining a reputation value for an activity weight of a monitored activity; adjusting, only for the source asset, the activity weight of the monitored activity by the reputation value associated with the activity weight; determining an asset reputation for the source asset from the activity weights associated with the monitored activities; and determining that the source asset is a security risk when the asset reputation exceeds a threshold. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The security system uses the reputations of other systems external to the source asset (e.g., destination assets, feedback from rejecting servers, etc.) to adjust the sensitivity of an algorithm that determines whether an asset as a security risk. Such adjustments result in fewer false positive detections, and fewer false negative detections.

The system uses a generic detection framework that does not require a priori knowledge of specific security risks (e.g., specific bots, viruses, and the like.). Instead, the detection framework utilizes a set of heuristics/activities that are commonly observed in the presence of security risks. This results in the added advantage of almost unlimited extensibility, as the heuristics are extensible as long as the accuracy of the heuristic for detecting a security risk is reasonably known.

The system instantiates tracking instance for each asset when that asset is monitored performing one of the suspect activities. Accordingly, detection of a security risk occurs in near real-time. However, the system will purge tracking instances for assets that are not monitored performing one of the suspect activities for predefined time period. Accordingly, the system allocates resources for tracking only assets that exhibit behavior that is indicative of a potential security compromise, and releases resources for assets that cease to exhibit such behavior before those assets are determined to be a security risk.

The details of one or more embodiments of the subject matter described in this specification are set forth in the accompanying drawings and the description below. Other

BRIEF DESCRIPTION OF THE DRAWINGS

FIGS. 3A and 3B are diagrams of example tracking instances.

FIGS. 4A and 4B are flowcharts of example process for adjusting a weight of a monitored activity.

Like reference numbers and designations in the various drawings indicate like elements.

DETAILED DESCRIPTION 1.0 Overview

This written description describes systems and methods for monitoring network assets and determining whether particular network assets are a security risk. In particular, the systems and methods implement a set of reputation algorithms that are applied to a behavioral correlation process. The behavioral correlation process generates a risk value for an asset based on the asset being observed performing one or more predefined activities. For each monitored activity that the asset is observed performing, the corresponding weights associated with that activity is attributed to the asset. The weights are then adjusted, e.g., increased or decreased, based on reputations of other devices, software or processes external to the asset, to generate a local reputation for the asset. For example, when a source asset is observed performing an activity in connection with a trusted server, the weights associated with the monitored activity for that asset are decreased. Conversely, when the source asset is observed performing the same activity in connection with a disreputable server, the weights associated with the monitored activity for that asset are increased. By increasing or decreasing the weights associated with the observed activities, the sensitivity of the corresponding risk detector algorithm is respectively increased or decreased. This results in fewer false positive detections, and fewer false negatives detections.

Figure 1:
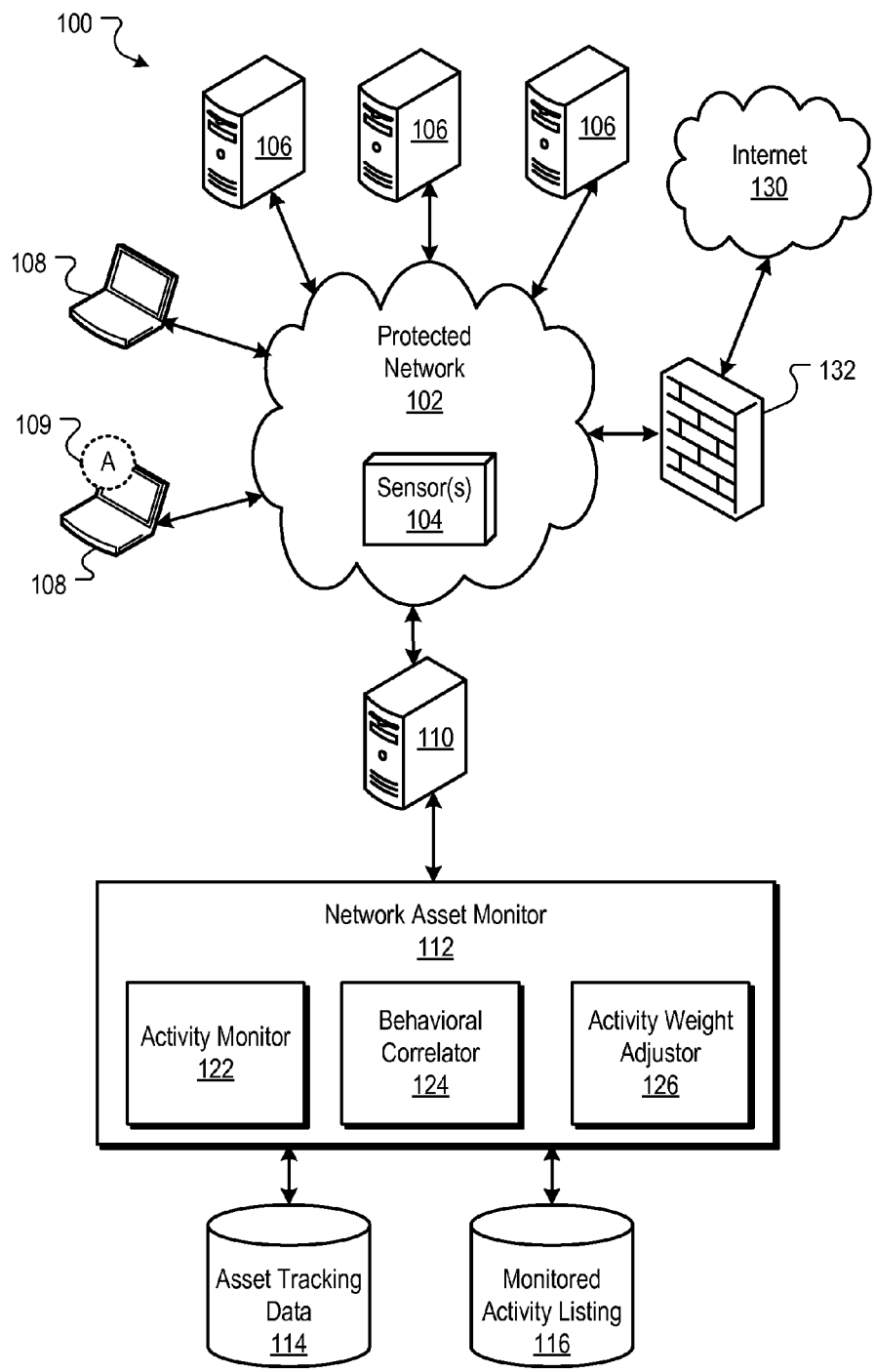
FIG. 1 is a diagram of an example network in which a network asset monitor is used to monitor network assets for security risks.

FIG. 1 is a diagram of an example network 100 in which a network asset monitor 112 is used to monitor network assets for security risks. A protected network 102, e.g., an enterprise network, is connected to an outside network 130 (e.g., the Internet), through a router implementing a firewall 132, and optionally other security protections. Computer assets, such servers 106, clients 108, and a data processing apparatus 110 communicate over the protected network 102. The data processing apparatus 110 includes one or more security servers used to provide one or more security services to protect the network 102 from threats. These threats include, for example, viruses, malware, and attacks. Each asset can be protected by a variety of countermeasures, one of which includes risk evaluation by a network asset monitor 112, which will be described in more detail below.

The assets are monitored by network based sensors 104. In some implementations, the network based sensors 104 are hardware devices and/or a software process in a data communication path between assets protected by the sensor and the network resources that the asset is attempting to access. An example network-based sensor 104 includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a data processing apparatus 110 and take further actions as instructed by a response to the query.

When an asset tries to send information through the network 102 or receive information over the network 102 through a network-based sensor 104, the sensor analyzes information about the asset and the information being sent or received and generates data about the information. The sensors 104 report this data to the network asset monitoring 112 running on the data processing apparatus 110.

2.0 Network Asset Monitoring

In some implementations, the network asset monitor 112 is designed to focus on a particular network that is logically independent from other networks. The network 102 is one example of such a network, e.g., an enterprise network where the entire network is typically on a private address space behind a network address translation (NAT) device (e.g., a router). Activities performed by the assets and reported by the sensors 104 are monitored by the network asset monitor 112. In particular, the activities that the network asset monitor 112 monitors are activities that are listed in a monitored activity listing 116. Typically the activities result from traffic internal to the private address range of the network, e.g., traffic originating from a source asset on the network to a destination asset on the network, such as within the address ranges of 172.16.X.X, 192.168.X.X, or 10.X.X.X, wherein each value of X ranges from 0-255), or originating from a source asset within the network to an asset outside of the network 102, or sent to a source asset from an asset outside of the network 102. The particular activities and heuristics that are monitored are discussed in more detail below, and examples of such activities are provided in Section 4.0 below.

Figure 2:
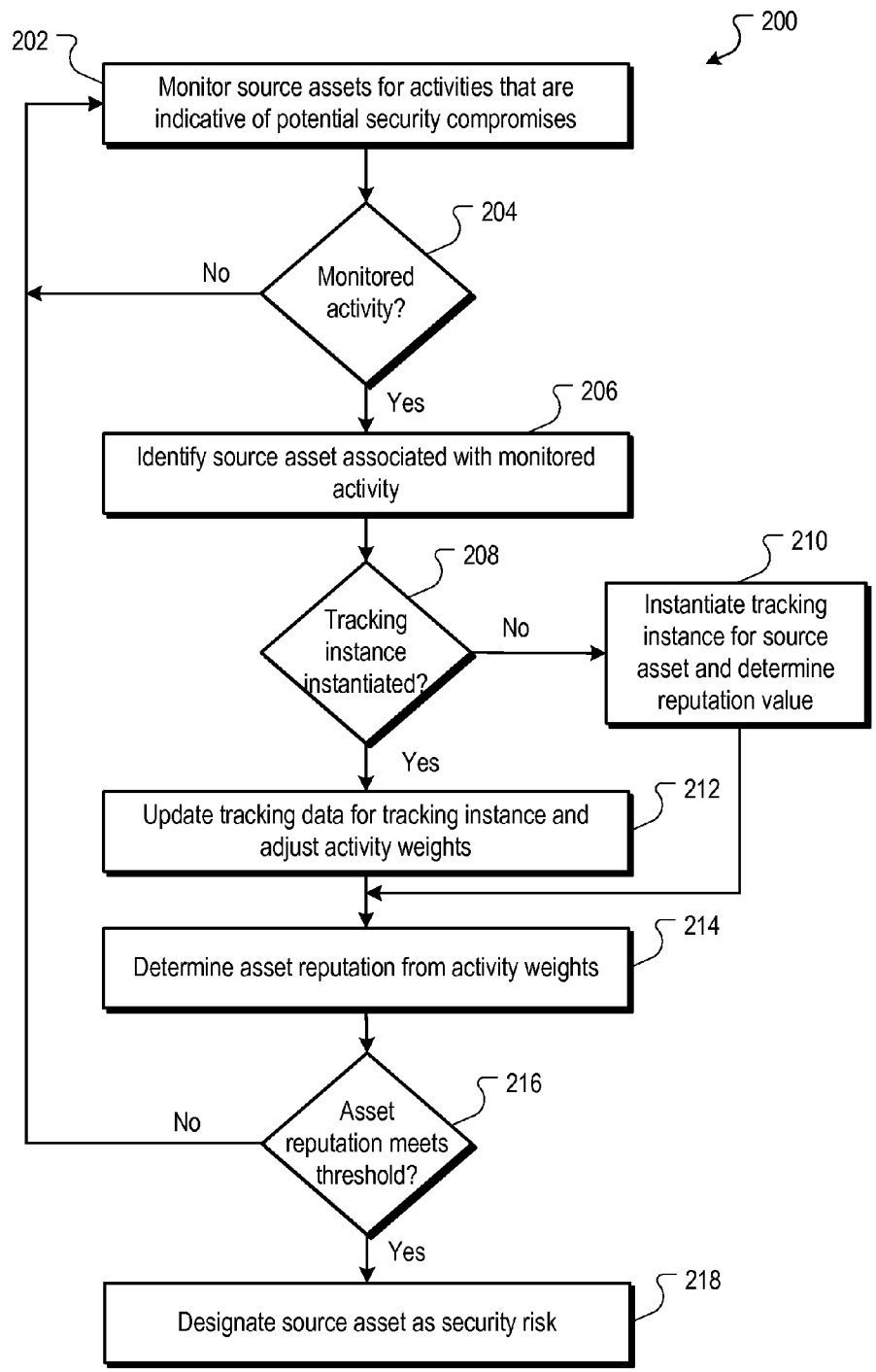
FIG. 2 is a flowchart of an example process for monitoring network assets.

In an example implementation, the network asset monitor 102 includes an activity monitor 122, a behavioral correlator 124, and an activity weight adjustor 126. Operation of the network asset monitor 112 is described with reference FIG. 2, which is a flowchart of an example process 200 for monitoring network assets.

The activity monitor 122 monitors source assets in the network 102 for activities that are indicative of potential security compromises (202). Each of the activities that are to be monitored is listed in the monitored activity listing 116 and is associated with a corresponding activity weight that is indicative of the reliability of the activity being the result of an actual security compromise.

In response to monitoring a source asset performing an activity indicative of a potential security compromise (204), the activity monitor 122 identifies the source asset associated with the monitored activity (206). In some implementations, the tracking of an asset is only initiated on monitoring of an activity listed in the monitored activity listing. By monitoring only source assets that perform or cause such activities, the number of assets that are tracked is significantly reduced. Accordingly, the memory resources that are required to store such tracking data are also reduced.

The activity monitor 122 determines if a tracking instance for the source asset has been instantiated in computer memory (208). A tracking instance is an instantiation of a data structure object that identifies the source asset and is associated with the source asset. Tracking instances are stored in asset tracking data 114. Each source asset being tracked has a corresponding tracking instance stored in the asset tracking data 114. The tracking instance also stores additional information, such as the time the instance was created, details regarding the monitored activities, and reputation information. Examples of tracking instances are describe with respect to FIGS. 3A and 3B If a tracking instance has not been instantiated, then the activity monitor 122 instantiates a tracking instance for the source asset (210). The tracking instance that is instantiated identifies the source asset, the monitored activity, and the time of the activity.

If a tracking instance has been instantiated, then the activity monitor 122 updates the tracking data for the tracking instance, and the activity weight adjustor 126 adjusts the activity weights (212). The update includes, for example, data describing the most recent monitored activity and the time of the activity.

To adjust the activity weights, the activity weight adjustor 126 determines a reputation value associated with the monitored activity, and adjusts a weight associated with the monitored activity by the reputation value. Examples of how reputation values are determined and how weights are adjusted are described with reference to FIGS. 3A, 3B, 4A and 4B below.

The behavior correlator 124 determines the asset reputation of the asset from the activity weights (214). In some implementations, the activity weights are one of a low weight, a medium weight or a high weight. The low weight is indicative of a low security risk, a medium weight is indicative of a medium security risk, and a high weight is indicative of a high security risk. For example, a high weight implies a strong likelihood that an asset is compromised (e.g., taken over by a bot), a medium weight implies a reasonable likelihood that an asset is compromised, and a low weight implies a low likelihood that an asset is compromised. In variations of this implementation, the activity weights are binned so that summing each of the activity weights results in the following relationships between low, medium and high activity weights: at least two low weights are equal to a medium weight, at least two medium weights are equal to a high weight, and at least two high weights constitute a security risk. The relationships can be adjusted by system administrators, e.g., four low weights may be required to generate a medium weight, etc.

The scoring scheme described above, and which is described in more detail below, is but one example scoring scheme that can be used. For example, instead of discrete weights of low, medium, and high, a larger range of weight values can be used, e.g., from 1 to 10, 1 to 100, etc. Likewise, the resulting value from the combination of the weights can also be accomplished in a variety of different ways.

The behavioral correlator 124 determines if the asset reputation meets a threshold (216). For example, a threshold may be the equivalent of two high weights; thus, a combination of a high weight and two medium weights (which are equal to a high weight) meets the threshold.

If the asset reputation meets the threshold, the behavioral correlator 124 designates the source asset as a security risk. In response to the designation, one or more security system may take one or more security measure with respect to the source asset, e.g., quarantining the source asset from the network, precluding access to the source asset, etc.

3.0 Activity Weights and Adjustments

FIGS. 3A and 3B are diagrams of example tracking instances 300 and 320, and FIGS. 4A and 4B are flowcharts of example process 400 and 420 for adjusting a weight of a monitored activity. The example process 400 is used on the tracking instance 300, and the example process 420 is use on the tracking instance 320. In particular, the processes 400 and 420 different in that the process 400 adjusts the weight of an activity based on a particular reputation value associated only with that activity, and the process 420 adjusts the weight of an activity based on the reputation value associated with the asset. In other words, the process 400 uses a per-activity weight adjustment, while the process 420 uses a global weight adjustment.

3.1 Per-Activity Weight Adjustment

The tracking instance 300 includes a tracking ID 302 that identifies a particular asset being tracked. The tracking ID 302 can be an IP address of the asset, a MAC address associated with the asset, or some other identifier that can uniquely identify the particular asset.

The tracking instance 300 also includes monitored activity fields 304. Each monitored activity field describes an activity that was monitored in connection with the asset. Examples of activities that are monitor described in more detail in section 4.0 below. Associated with each activity is a reputation value 306. For the tracking instance 300, the reputation value is a value that is used to adjust only the corresponding activity value with which it is associated. There is a variety of ways in which reputation value can be determined for a particular activity. In particular, the reputation value for an activity is representative of a reputation of an activity in the particular context in which the activity was performed or observed. For example, a reputation associated with an activity can be determined from one more the following: a reputation of an IP/domain/URL of a connection; a reputation of an executable that is downloaded; a reputation derived from feedback information from one or other computer devices; a reputation derived from an inferred knowledge level of a local network; a reputation related to a stepping stone detection etc. Derivation of reputation values are described in more detail below.

The tracking instance 300 also includes an asset reputation value 308. The asset reputation value 308 is derived from the weights associated with the monitored activities 304 as modified by the respective reputation values 306, and as described with reference to the process 400.

When implementing the process 400, the activity weight adjustor 126 determines a reputation associated with the monitored activity (402). For example, for a reputation of an IP/domain/URL of a connection, the activity weight adjustor 126 determines a destination IP/domain/or URL of a connection that the source asset is attempting to establish or has established. Using this information, the activity weight adjustor 126 queries a reputation database (not shown) to receive a reputation score associated with destination. Reputation databases are known in the art, and a variety of different reputation databases can be used. For example, if the reputation is found to be "good" (e.g., trustworthy, clean, etc.), then the reputation value that is indicative of this reputation is stored and associated with the monitored activity by the behavior correlator 124. Conversely, if the reputation of the destination is found to be "malicious" (e.g., untrustworthy, infected with a virus/bots, etc.), then a reputation value that is indicative of this reputation is stored and associated with the monitored activity by the activity weight adjustor 126.

In some implementations, the value for a good reputation is less than the value for a bad reputation. For example, the value of a good reputation may be 0.5, the value of an unknown reputation maybe 1.0, and the value of a malicious reputation may be 1.5. Other values can also be used.

In the case of an activity being a downloaded executable, the activity weight adjustor 126 can determine a reputation of the executable (e.g., by a virus scan, or querying a database that stores reputations of executable). As with a destination address, the reputation may be malicious, unknown, or good, and a corresponding reputation value can be set accordingly.

In the case of the monitored activities including communication attempts to destination computer devices external to the network, the reputation can b derived from feedback information from the computer devices. For example, responses from the destination computer devices that are indicative of a denied request due to a determination that the communication attempt from the source asset is indicative of a potential security compromise can be collected, and the activity weight adjustor 126 sums the number of such response to derive a reputation value. The higher the number of responses, the more likely the reputation value is to be indicative of a malicious reputation.

For example, spam bots often attempt to identify open SMTP relays from where they can send spam. The spam bots intentionally do not use a fixed list of relays, and instead probe a large number of relays to determine which ones are open and available without authentication. During this process connections are made or attempted to devices that are either unavailable, without authentication (which can be a monitored activity) or that just reject the connection based on a bad source IP reputation as determined by the destination device. The latter rejections are used to count as "votes" for the reputation value. For example, if three or more SMTP servers (either within the network 102 or outside of the network 102) reject the request, then the reputation value for the activity is set to a value that is indicative of malicious.

By way of another example, some bots use micro-blog services as their command and control channels. The channels, when discovered, are typically taken down by the service providers. Thus the bots use a query algorithm to query channels and find a channel that has not yet been taken down. However, in this process, the bots end up querying many channels that either do not exist or have a taken down notice. The responses from the service provider indicating that the channels do not exist/have been taken down are used to count as "votes" for the reputation value.

A reputation derived from an inferred knowledge level of a local network is based on the premise that a bot, upon entering a network, usually lacks knowledge of the network. The bot thus first scans what services are available on machines. The bot that scans a local network for services often attempts to connect to destination port-IP pairs that typically no other local host of that network connects to, or does not exist. Thus, an inference of a lack of internal network knowledge is a heuristic that is similar to the spam bot rejections as described above. The activity weight adjustor 126, in some implementations, can reference a probability tree of how likely/unlikely various local <dst-IP, dst-port> pairs are as destinations of local connections. Sources in which monitored activities include attempts to connect to connect to three or more destination services that are rarely or never connected to on the local network are set to have a higher reputation value for that activity than sources in which fewer or no such activities are monitored.

For a stepping stone detection, the activity weight adjustor 126, in response to the monitoring of activities that include incoming attacks to a source asset, followed by a bot-like activity or an outbound attack detection from the source asset, sets a "malicious" reputation value for the activities. This is because a likely scenario for an inbound attack followed by outbound malicious/suspicious activity is that an external attacker has used the source asset as a stepping stone for perpetrating further attacks.

The process 400 adjusts the weights of the monitored activities by their respectively associated reputation values (404). For example, the activity weight adjustor 126 adjusts the weight of the monitored activity 304-1 by the reputation value 306-1, and adjusts the weight of the monitored activity 304-$k$ by the reputation value 306-$k$. Because each of the reputation values 306 are determined according to the particular context in which the activity was observed or performed, some of the reputation values may be indicative of trustworthy reputations, while some of the other reputation values may be indicative of malicious reputations. Accordingly, weights for activities that are observed in a malicious context are elevated, and weights for activities that are observed in a trustworthy context are diminished.

The adjusted weights are then used to determine the asset reputation value 308 (406). As described above, the adjusted weights may be binned so that two or more low weights are equal to a medium weight, and two or more medium weights are equal to a height weight. Thus, monitored activities with low associated weights and that are observed in a trustworthy context will be less likely to generate a false positive determination that an asset is compromised. For example, if the reputation value of a trustworthy reputation is 0.5, then at least for monitored activities with low weights are required to generate a medium weight. By the same principle, monitored activities with low associated weights that are observed in a malicious context will be much more likely to cause the correlator 126 to generate a determination that an asset is compromised. Accordingly, the likelihood of a false negative determination is reduced.

3.2 Global Weight Adjustment

The tracking instance 320 is similar to the tracking instance 300, except the tracking instance 300 includes only one reputation value 326. The single reputation value is derived from the reputational contexts of each of the individual activities, and is then used to adjust all of the activity weights associated with the monitored activities identified in the tracking instance 320.

The process 420 is used in conjunction with the tracking instance 320. When implementing the process 420, the activity weight adjustor 126 determines reputations associated with the monitored activities (422). This process step is similar to the process step 402 of the process 400 as described above.

The activity weight adjustor 126 then determines the reputation value 328 of the asset (424). For example, the adjustor 126 may implement a voting scheme in which one or more "malicious" reputation values cause the asset reputation value to be set to malicious; four or more "unknown" reputation values caused the asset reputation value to be set to malicious; and reputation values of trustworthy have no effect on the asset reputation. Other functions to determine asset reputation value that take as input the constituent reputation values of the monitored activities can also be used.

The activity weight adjustor 126 then adjust the weights of all monitored activities by the reputation value 328 (426). The correlator 124 then determines an asset reputation from the adjusted activity waits (428). In this implementation, all the weights are adjusted by the same reputation value. Accordingly, if the reputation value of the asset is trustworthy, the likelihood of a false positive determination of a security compromise is reduced. Conversely, if the reputation value the asset is unknown or malicious, the likelihood of a false negative determination is respectively decreased by the respectively increased value for "unknown" or "malicious."

4.0 Monitored Activities

As described above, a variety of different activities can be monitored for determining whether an asset is a security risk. These activities and their corresponding weights are stored in the monitored activity listing 116. An example listing of monitored activities is provided in Table 1 below. This example listing provided below is not exhaustive, and is extensible.

In some implementations, the activities that are listed can be tailored to the particular goal of the monitoring system. For example, if the network asset monitor 112 is primarily implemented to detect bot attacks, the activities that are monitored are activities that use one or more of SSL, HTTP, FTP, IRC, DNS, P2P, SMB/Netbios, and SMTP protocols, as bot attacks are typically conducted using these protocols.

TABLE 1

| Activity | Weight |
| --- | --- |
| SSL Unix-Timestamp too old OR too long into the future | Low |
| SSL Handshake failure | Low |
| SSL Rare extensions used | Low |
| SSL Short-lived certificate | Medium |
| SSL Fake-ssl traffic | Medium |
| DNS Too many A query failures in a short time | Medium |
| DNS MX queries from the end-point | Low |
| HTTP Steganographically hidden executable file in non executable files | High |
| HTTP/Netbios/SMTP Executable detected as malware | High |
| HTTP Too many micro-blog server failures | Medium |
| SMTP 5xx from 3+ servers without client "speaking" | High |
| SMTP 550, 553, 554 errors from 10+ servers within a conversation | High |
| SMTP N+ emails sent rapidly, but only 1 per flow | Medium |
| SMTP Unauthenticated sends across N+ servers | Medium |
| IRC IRC activity detection | High |
| P2P Unknown (gray-listed) evasive/obfuscated P2P sweep detection | Medium |

5.0 Resource Management

Figure 5:
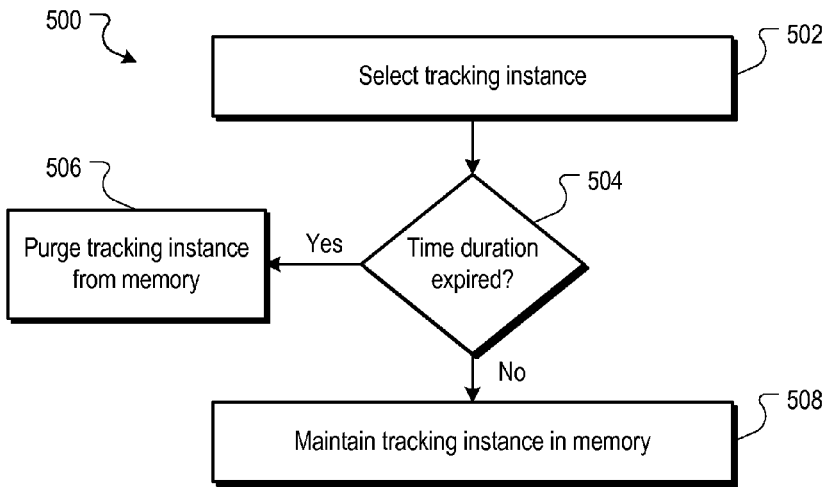
FIG. 5 is a flow chart of an example process for purging asset tracking instances from a computer memory.

FIG. 5 is a flow chart of an example process 500 for purging asset tracking instances from a computer memory. The process 500 can be implemented in the data processing apparatus 110 by the network asset monitor 112.

The network asset monitor 112 selects a tracking instance (502). For example, as part of a maintenance routine for the asset tracking data 114, the network asset monitor 112 sequentially selects each tracking instance for analysis.

The network asset monitor 112 determines if a time duration has expired (504). For example, if the difference between the current time and the time of the last monitored activity that was recorded in the tracking instance is greater than time duration, the time duration has expired.

If the time duration has not expired, then the network asset monitor maintains the tracking instance in memory 506). Conversely, if the time duration has expired, the network asset monitor 112 purchased the tracking instance from memory (508).

6.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Figure 6:
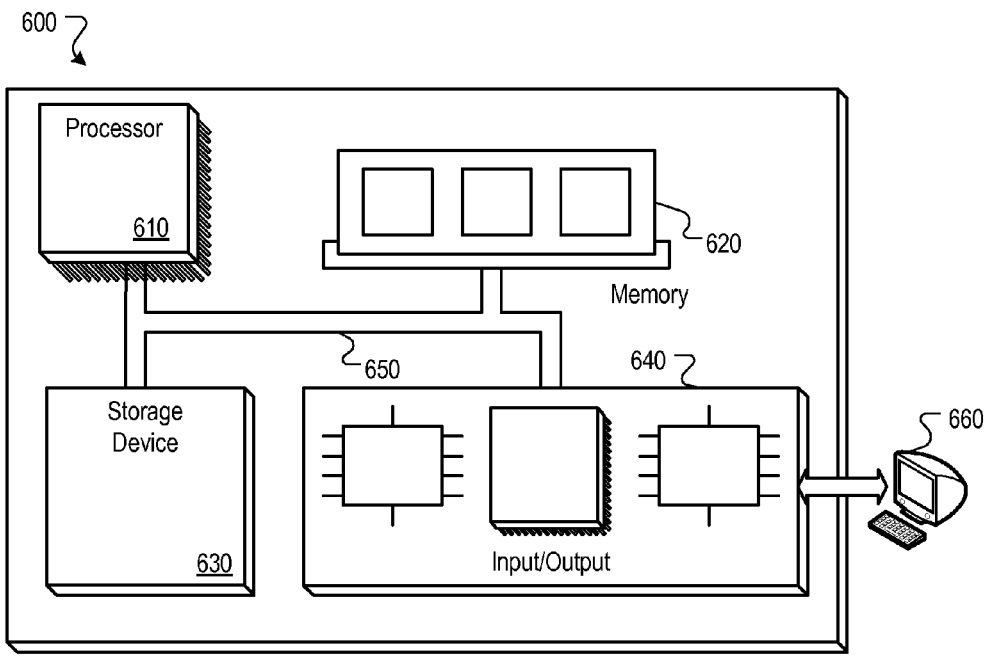
FIG. 6 is a block diagram of an example computer system that can be used to implement the processes and systems described with respect FIGS. 1-5 above.

One example computer system is shown in FIG. 6, which is a block diagram of an example computer system 500 that can be used to implement the processes and systems described with respect to FIGS. 1-5 above. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, a solid state drive, and/or other large capacity storage devices.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    monitoring source assets in a network for activities indicative of potential security compromises, wherein the network comprises an internet protocol based network logically independent from other internet protocol networks, and each activity to be monitored is associated with a corresponding activity weight to indicate probability of the respective activity resulting from a respective, actual security compromise;
    determining that a particular one of the monitored source assets performs a particular monitored activity indicative of a potential security compromise, wherein the particular activity comprises a download of an executable having a malicious reputation;
    instantiating a particular source asset tracking instance in a computer memory, the source asset tracking instance including data identifying the particular source asset and the particular monitored activity, wherein the source asset tracking instance is to be updated based on identification of subsequently monitored activities, performed by the particular source asset, indicative of potential security compromises;

determining a reputation value for the corresponding activity weight of the particular monitored activity based at least in part on the malicious reputation of the executable;

adjusting, for the particular source asset, the corresponding activity weight of the particular monitored activity based at least in part on the reputation value;

determining an asset reputation for the particular source asset from the corresponding activity weights associated with monitored activities involving the particular source asset; and determining a security risk associated with the particular source asset when the asset reputation exceeds a threshold.

2. The method of claim 1, wherein:
the source asset tracking instance further includes data identifying another monitored activity involving the particular source asset, wherein the other monitored activity comprises a communication from the particular source asset to a destination address external to the network; and determining a reputation value for the corresponding activity weight of the other monitored activity comprises:
determining a reputation associated with the destination address;
determining the reputation value for the corresponding activity weight of the other monitored activity based on the reputation associated with the destination address.

3. The method of claim 2, wherein the corresponding activity weight of the other monitored activity is to be adjusted, only for the particular source asset, based at least in part on the reputation associated with the destination address.

4. The method of claim 1 wherein adjusting, only for the particular source asset, the corresponding activity weight of the particular monitored activity comprises:
adjusting the particular activity weight for monitored activities performed in response to execution of the executable by the particular source asset.

5. The method of claim 1, wherein:
the source asset tracking instance further includes data identifying another monitored activity involving the particular source asset, wherein the other activity comprises one or more communication attempts by the particular source asset to destination computer devices external to the network; and determining a reputation value for the activity weight of the other monitored activity comprises:
determining a number of responses from the destination computer devices that are indicative of a denied request due to a determination that the communication attempt from the particular source asset is indicative of a potential security compromise; and
determining the reputation value for the activity weight of the other monitored activity based on the number.

6. The method of claim 5, wherein the corresponding activity weight of the other monitored activity is to be adjusted, only for the particular source asset, based at least in part on the reputation value for the activity weight of the other monitored activity.

7. The method of claim 1, wherein:
the source asset tracking instance further includes data identifying another monitored activity involving the particular source asset, wherein the other activity comprises one or more communication attempts by the particular source asset to destination computer devices; and determining a reputation value for the activity weight of the other monitored activity comprises:
determining a number of responses from the destination computer devices that are indicative of a non-existent destination address to which the communication attempt was directed; and
determining the reputation value for the activity weight of the other monitored activity based on the number.

8. The method of claim 7, wherein the corresponding activity weight of the other monitored activity is to be adjusted, only for the particular source asset, based at least in part on the reputation value for the activity weight of the other monitored activity.

9. The method of claim 1, wherein:
the source asset tracking instance further includes data identifying another monitored activity involving the particular source asset, wherein the other activity comprises an incoming attack detected on the particular source asset and an outgoing attack detected from the particular source asset; and determining a reputation value for the activity weight of the other monitored activity is to be based at least in part on the number.

10. The method of claim 9, wherein the corresponding activity weight of the other monitored activity is to be adjusted, only for the particular source asset, based at least in part on the reputation value for the activity weight of the other monitored activity.

11. The method of claim 1, wherein:
each activity weight is one of a set comprising a low weight, medium weight or high weight, wherein a low weight is indicative of a low security risk, a medium weight is indicative of a medium security risk, and a high weight is indicative of a high security risk; and the method further comprises:
determining from the activity weights associated with the monitored activities involving the particular source asset a security score for the particular source asset, wherein determining the security score comprises:
summing each of the activity weights so that at least two low weights are equal to a medium weight, two medium weights are equal to a high weight, and two high weights constitute a security risk.

12. The method of claim 1, wherein the monitored activities include communications that use one or more of the following protocols: SSL, HTTP, FTP, IRC, DNS, P2P, SMB/Netbios, and SMTP.

13. The method of claim 1, wherein the source asset tracking instance is one of a plurality of source asset tracking instances in computer memory and the method further comprises, for each source asset tracking instance in the computer memory:
in response to not monitoring an activity that is indicative of a potential security compromise for a predefined time period, purging the source asset tracking instance from the computer memory.

14. A non-transitory computer readable medium comprising instructions executable by a data processing apparatus and that cause the data processing apparatus to perform operations comprising:
monitoring source assets in a network for activities indicative of potential security compromises, wherein the network comprises an internet protocol based network logically independent from other internet protocol networks, and each activity to be monitored is associated with a corresponding activity weight to indicate probability of the respective activity resulting from a respective, actual security compromise;

determining that a particular one of the monitored source assets performs a particular monitored activity indicative of a potential security compromise, wherein the particular activity comprises a download of an executable having a malicious reputation;

instantiating a particular source asset tracking instance in a computer memory, the source asset tracking instance including data identifying the particular source asset and the particular monitored activity, wherein the source asset tracking instance is to be updated based on identification of subsequently monitored activities, performed by the particular source asset, indicative of potential security compromises;

determining a reputation value for the corresponding activity weight of the particular monitored activity based at least in part on the malicious reputation of the executable;

adjusting, for the particular source asset, the corresponding activity weight of the particular monitored activity based at least in part on the reputation value;

determining an asset reputation for the particular source asset from the corresponding activity weights associated with monitored activities involving the particular source asset; and determining a security risk associated with the particular source asset when the asset reputation exceeds a threshold.

15. The non-transitory computer readable medium of claim 14, wherein:

the source asset tracking instance further includes data identifying another monitored activity involving the particular source asset, wherein the other monitored activity comprises a communication from the particular source asset to a destination address external to the network; and determining a reputation value for the corresponding activity weight of the other monitored activity comprises:
determining a reputation associated with the destination address;
determining the reputation value for the corresponding activity weight of the other monitored activity based on the reputation associated with the destination address.

16. The non-transitory computer readable medium of claim 14, wherein:

the source asset tracking instance further includes data identifying another monitored activity involving the particular source asset, wherein the other activity comprises one or more communication attempts by the particular source asset to destination computer devices external to the network; and determining a reputation value for the activity weight of the other monitored activity comprises:
determining a number of responses from the destination computer devices that are indicative of a denied request due to a determination that the communication attempt from the particular source asset is indicative of a potential security compromise; and
determining the reputation value for the activity weight of the other monitored activity based on the number.

17. The non-transitory computer readable medium of claim 14, wherein:

the source asset tracking instance further includes data identifying another monitored activity involving the particular source asset, wherein the other activity comprises one or more communication attempts by the particular source asset to destination computer devices; and determining a reputation value for the activity weight of the other monitored activity comprises:
determining a number of responses from the destination computer devices that are indicative of a non-existent destination address to which the communication attempt was directed; and
determining the reputation value for the activity weight of the other monitored activity based on the number.

18. The non-transitory computer readable medium of claim 14, wherein:

the source asset tracking instance further includes data identifying another monitored activity involving the particular source asset, wherein the other activity comprises an incoming attack detected on the particular source asset and an outgoing attack detected from the particular source asset; and determining a reputation value for the activity weight of the other monitored activity is to be based at least in part on the number.

19. The non-transitory computer readable medium of claim 14, wherein:

each activity weight is one of a set comprising a low weight, medium weight or high weight, wherein a low weight is indicative of a low security risk, a medium weight is indicative of a medium security risk, and a high weight is indicative of a high security risk; and the method further comprises:
determining from the activity weights associated with the monitored activities involving the particular source asset a security score for the particular source asset, wherein determining the security score comprises:
summing each of the activity weights so that at least two low weights are equal to a medium weight, two medium weights are equal to a high weight, and two high weights constitute a security risk.

20. A system comprising:

a data processing apparatus; and a non-transitory computer readable medium storing instructions executable by the data processing apparatus and that cause the data processing apparatus to perform operations comprising:

monitoring source assets in a network for activities indicative of potential security compromises, wherein the network comprises an internet protocol based network logically independent from other internet protocol networks, and each activity to be monitored is associated with a corresponding activity weight to indicate probability of the respective activity resulting from a respective, actual security compromise;

determining that a particular one of the monitored source assets performs a particular monitored activity indicative of a potential security compromise, wherein the particular activity comprises a download of an executable having a malicious reputation;

instantiating a particular source asset tracking instance in a computer memory, the source asset tracking instance including data identifying the particular source asset and the particular monitored activity, wherein the source asset tracking instance is to be updated based on identification of subsequently monitored activities, performed by the particular source asset, indicative of potential security compromises;

determining a reputation value for the corresponding activity weight of the particular monitored activity based at least in part on the malicious reputation of the executable;

adjusting, for the particular source asset, the corresponding activity weight of the particular monitored activity based at least in part on the reputation value;

determining an asset reputation for the particular source asset from the corresponding activity weights associated with monitored activities involving the particular source asset; and determining a security risk associated with the particular source asset when the asset reputation exceeds a threshold.

* * * * *